United States Patent
Gao

(10) Patent No.: US 8,903,449 B2
(45) Date of Patent: Dec. 2, 2014

(54) INTELLIGENT DIALING METHOD AND INTELLIGENT DIALING TERMINAL

(75) Inventor: Honghua Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 247 days.

(21) Appl. No.: 13/389,322

(22) PCT Filed: Jun. 25, 2010

(86) PCT No.: PCT/CN2010/074446
§ 371 (c)(1),
(2), (4) Date: Feb. 7, 2012

(87) PCT Pub. No.: WO2011/020378
PCT Pub. Date: Feb. 24, 2011

(65) Prior Publication Data
US 2012/0135721 A1    May 31, 2012

(30) Foreign Application Priority Data
Aug. 18, 2009   (CN) .......................... 2009 1 0165696

(51) Int. Cl.
*H04M 1/00* (2006.01)
*H04M 1/2745* (2006.01)
*H04M 1/253* (2006.01)

(52) U.S. Cl.
CPC ...... *H04M 1/274566* (2013.01); *H04M 1/2535* (2013.01)
USPC ........ 455/551; 455/460; 455/461; 455/414.1; 379/88.2; 379/127.01; 379/142.09; 379/142.1; 379/207.14; 379/207.15; 379/354

(58) Field of Classification Search
USPC .............. 455/460, 461, 551, 414.1; 379/88.2, 379/127.01, 142.09, 142.1, 207.14, 207.15, 379/354
See application file for complete search history.

(56) References Cited

U.S. PATENT DOCUMENTS 7,630,986 B1 * 12/2009 Herz et al. ........................... 1/1
2001/0049738 A1 * 12/2001 Doi ............................... 709/228

(Continued)

FOREIGN PATENT DOCUMENTS

| CN | 101052168 A | 10/2007 |
| CN | 101098553 A | 1/2008 |

(Continued)

OTHER PUBLICATIONS

International Search Report for PCT/CN2010/074446 dated Sep. 20, 2010.

*Primary Examiner* — Mehmood B Khan
(74) *Attorney, Agent, or Firm* — Stephen Yang; Ling Wu; Ling and Yang Intellectual Property

(57) ABSTRACT

An intelligent dialing method and a terminal are provided by the present invention. The method includes: a terminal receiving a called number input by a user and inquiring home location information of the called number; obtaining home location information of a local host number and information of a telecommunication operator to which the local host number belongs; determining a call type of this call according to the home location information of the called number and the home location information of the local host number; extracting a dialing prefix corresponding to the telecommunication operator to which the local host number belongs and the call type according to corresponding relationship information among a stored dialing prefix with the telecommunication operator and the call type; and combining the extracted dialing prefix with the called number into a target number to make the call.

11 Claims, 5 Drawing Sheets

(56) References Cited

U.S. PATENT DOCUMENTS

| | | | |
|---|---|---|---|
| 2005/0114367 A1* | 5/2005 | Serebrennikov | 707/100 |
| 2011/0158228 A1* | 6/2011 | Dowling et al. | 370/352 |
| 2013/0097664 A1* | 4/2013 | Herz et al. | 726/1 |
| 2014/0161033 A1* | 6/2014 | Dowling et al. | 370/328 |

FOREIGN PATENT DOCUMENTS

| | | |
|---|---|---|
| CN | 101640727 A | 2/2010 |
| DE | 19711096 A1 | 9/1998 |
| EP | 1659817 A2 | 5/2006 |

* cited by examiner

INTELLIGENT DIALING METHOD AND INTELLIGENT DIALING TERMINAL

TECHNICAL FIELD

The present invention relates to the field of mobile communication, and in particular, to an intelligent dialing method and a terminal.

BACKGROUND OF THE RELATED ART

The Internet protocol (IP) phone call is a kind of digital phone call and is a kind of communication services brought by the technology innovation. The IP phone call incorporates various switching processing, such as voice, compression coding, packaging packets, allocating routing, storing and switching, and depackaging and decompressing, etc., into the IP network or the internet, thereby implementing the voice communication, promoting the utilization of the network resources and reducing the voice service cost. Therefore, the IP phone call is rapidly developed in the worldwide, who can be regarded as one of the fastest developed and most rapidly popular application service technologies in the world nowadays and also is one of the hot spots concerned by the computer network industry.

At present, the development potentiality of the IP phone call is the cheap price. Along with the evolution trend from the circuit switching to the packet switching, the value-added service based on the IP phone call presents an unprecedented vitality, thereby providing more business opportunities for the IP phone call operator and the Internet service provider (ISP), etc. Consequently, each domestic operator provides the respective IP phone call service one after another. However, the IF phone call produces a plurality of inconvenience at the same time when bringing benefits for people.

For the mobile international long distance service, the dialing procedure of direct dialing refers to FIG. 1a, wherein the dialing prefix which requires adding is "an international access code+a country or area code", and the international access code here is "00"; after determining that the terminal has already opened the international long distance IP function, the procedure of IP dialing adding 17951 refers to FIG. 1b, wherein the dialing prefix which requires adding is "17951"+"00"+"a country or area code".

Obviously, the whole dialing procedure is relatively complex. Certainly the most complex case is in the international roaming state. The dialing mode of the roaming international long distance call is "an international access code"+"a country code"+"an area code"+"a user number", as shown in FIG. 1c. In this case, if dialing an IP call is required, then the IP dialing-in number of the international roaming operator requires adding, and the dialing mode is "an IP dialing-in number of the international roaming operator"+"an international access code"+"a country code"+"an area code"+"a user number", as shown in FIG. 1d. The "international access code" is an international long distance prefix which requires adding when the user in the international roaming state dials a phone call out of the roaming area. "+" is defined as the universal international access code in the technical standard of the global system for mobile communications (GSM), that is, no matter which country the user roams to, the user can use "+" instead of the GSM international access code. However, there is no a universal international access code in the code division multiple access (CDMA) network, and the international access codes of different countries and different operators may be different. For example, the international access code of America and Canada is 011, and the one of Korea is 001 (or 002, 008, 00700), the one of Australia is 0011 and the one of Hong Kong is 001.

For example, a CDMA user roaming to America is required to dial a fixed telephone 0216650** in Shanghai, China, of which a dialing mode should be: 011+86+21+6650, wherein "011" is the international access code of America, "86" is the country code of China, and "21" is the area code of Shanghai. Herein, it should be specifically noted that when a user in the international roaming state dials the fixed telephone in China mainland, there is no need to add "0" before the area code. The dialing mode of the user dialing a mobile phone of Shanghai is similar to this, that is, 011+86+1367186**. Similarly, the mode for dialing the IP call is also very complex, and here will be not repeated.

SUMMARY OF THE INVENTION

The technical problem to be solved in the present invention is to provide an intelligent dialing method and a terminal. The dialing prefix can be added automatically for calling as long as the user inputs the called number when making an IP call or international call, which simplifies the dialing procedure of the user.

In order to solve the above technical problem, on one hand, an intelligent dialing method is provided, which comprises:

a terminal receiving a called number input by a user and inquiring home location information of the called number;

obtaining home location information of a local host number and information of a telecommunication operator to which the local host number belongs;

determining a call type of this call according to the home location information of the called number and the home location information of the local host number;

extracting a dialing prefix corresponding to the call type and the telecommunication operator to which the local host number belongs according to corresponding relationship information among a stored dialing prefix with the telecommunication operator and the call type; and combining the extracted dialing prefix with the called number into a target number to make the call.

On the other hand, a terminal is provided, which comprises an input unit, a control unit, a storage unit, a number home location inquiry unit and a call unit, wherein the input unit is configured to: transmit a called number input by a user to the control unit;

the storage unit is configured to: store a database storing corresponding relationship information among a dialing prefix with a telecommunication operator and a call type;

the number home location inquiry unit is configured to: inquire home location information of a number;

the control unit is configured to: receive the called number, and then transmit the called number to the number home location inquiry unit to inquire the home location, and then receive the home location information of the called number fed back by the number home location inquiry unit; obtain home location information of a local host number and information of a telecommunication operator to which the local host number belongs; determine the call type of this call according to the home location information of the called number and the home location information of the local host number; extract a dialing prefix corresponding to the telecommunication operator to which the local host number belongs and the call type from the database according to the corresponding relationship information among the stored dialing prefix with the telecommunication operator and the call type; and combine the extracted dialing prefix with the called number into a target number and then transmit the target number to the call unit;

the call unit is configured to: call using the target number after receiving the target number.

The intelligent dialing method and the terminal provided by the present invention are able to automatically inquire the information of the home location of the called number, etc., and add the proper dialing prefix after the user dials, thereby reducing the complexity of the user's operation and improving the effect of the user's experience.

PREFERRED EMBODIMENTS OF THE PRESENT INVENTION

The technical scheme of the present invention is described in detail with reference to the accompanying drawings and in combination with embodiments hereinafter.

Figure 1A:
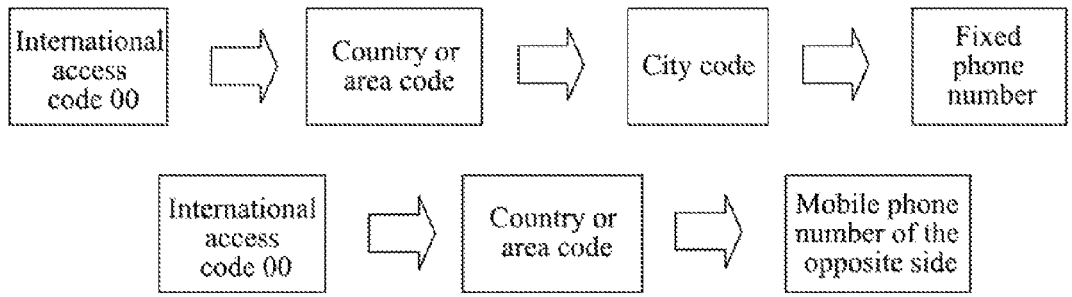
FIG. 1a is a schematic diagram of an international long distance dialing mode.
Figure 1B:
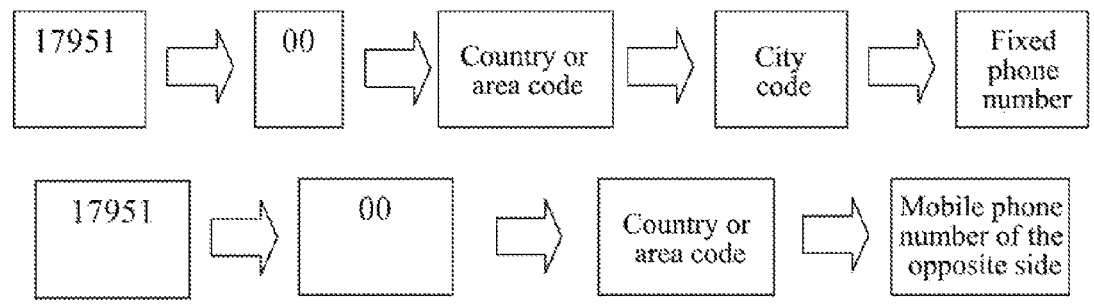
FIG. 1b is a schematic diagram of an international long distance IP dialing mode.
Figure 1C:
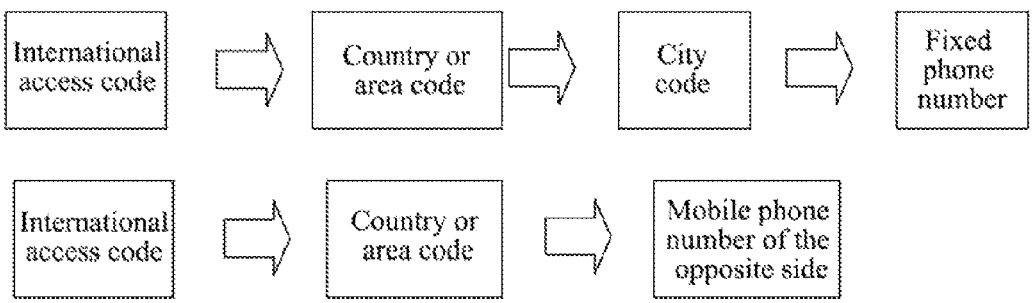
FIG. 1c is a schematic diagram of an international roaming dialing mode.
Figure 1D:
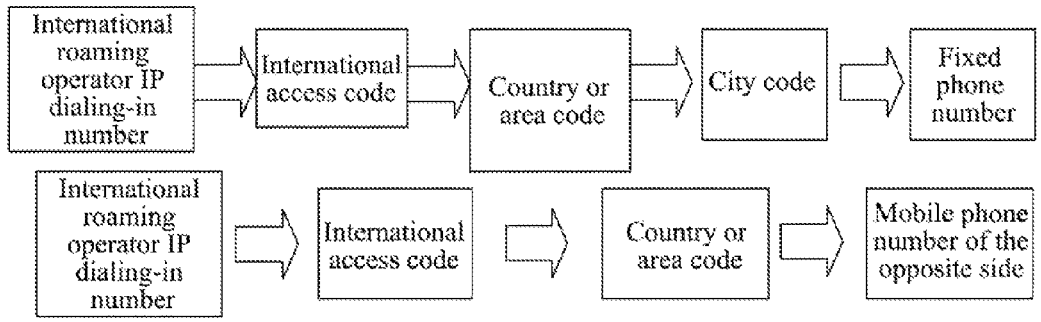
FIG. 1d is a schematic diagram of an international roaming IP dialing mode.
Figure 2:
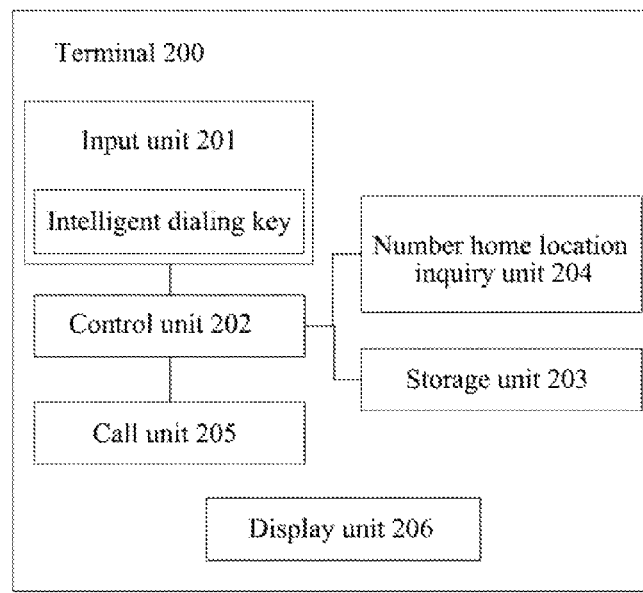
FIG. 2 is a schematic diagram of a terminal according to an embodiment of the present invention.

FIG. 2 is a schematic diagram of a terminal 200 according to an embodiment of the present invention; as shown in FIG. 2, the terminal 200 of the present embodiment comprises an input unit 201, a control unit 202, a storage unit 203, a number home location inquiry unit 204 and a call unit 205, wherein the input unit 201 is configured to: generate a corresponding key pressing signal according to a key pressing operation of the user and transmit the key pressing signal to the control unit 202. In the present embodiment, the input unit 201 is mainly configured to: transmit the called number input by the user pressing keys and a triggering signal of the subsequently pressed intelligent dialing key for entering into the intelligent dialing state to the control unit 202.

The storage unit 203 stores a prefix database, and the dialing prefixes of different SIM card operators in different scenarios can be inquired through the prefix database. Since the IP dialing-in numbers of the IP phone call services instituted by different SIM card operators are not unified, for example, the IP dialing-in number of the SIM card operator China Mobile is like 17951, and the IP dialing-in number of the SIM card operator China Unicorn is like 17911; furthermore, the international access codes, the country codes or the area codes instituted by different SIM card operators may also be different, so the database stores the IP dialing-in number, the international access code, the country code and the area code, etc, corresponding to each SIM card operator.

The number home location inquiry unit 204 is configured to: inquire the borne location information of the number.

When the user inputs a number, the number home location inquiry unit 204 is able to quickly inquire the information, such as the country or area to which the number belongs. The number home location inquiry unit 204 of the present embodiment can inquire the information of the called number belongs to which country and which province and city, etc. How to inquire the home location information of the called number and the local host number specifically has various implementing mode, for example, the home location information can be inquired through the network or through the local database. Herein, it should be noted that the home location inquiry function is mainly related to the mobile phone number; however, for the fixed telephone, the user is required to input the necessary area code or country code when dialing.

The control unit 202 receives the triggering signal for entering into the intelligent dialing state transmitted by the input unit 201, and then transmits the called number to the number home location inquiry unit 204 to inquire the home location of the number; then the control unit 202 receives the home location information of the called number fed back from the number home location inquiry unit 204; at the same time, the control unit 202 can obtain the home location information of the local host number and the information of the telecommunication operator to which the local host number belongs from the local host SIM card, and furthermore the control unit 202 can also detect the current location information of the local host; then the control unit 202 determines the call type of this call according to the home location information of the called number and the local host number and/or the current location information of the local host, for example, the domestic long distance call the international long distance call or the international roaming call, etc.; then extracts the corresponding dialing prefix from the database according to the determined call type and the information of the telecommunication operator to which the local host number belongs; then combines the extracted dialing prefix and the called number into a target number according to the defined dialing rule, for example; when the user dials an international long distance call, the telephone number of the opposite side only requires inputting, and the terminal will add the prefix "IP access code+00+country or area code" automatically; and then transmits the target number to the call unit 205.

Certainly, the home location information of the local host number also can be inquired by the number home location inquiry unit 204.

The call unit 205 calls using the target number after receiving the target number.

The terminal 200 of the present embodiment further comprises a display unit 206, which can display the target number.

The terminal of the present invention is able to largely simplify the complex dialing procedure of the user in the specified time and occasion. Simultaneously, the terminal of the present invention is able to improve the user experience effectively and save the call cost of the user, and the cost of applying the present method is cheap.

Figure 3:
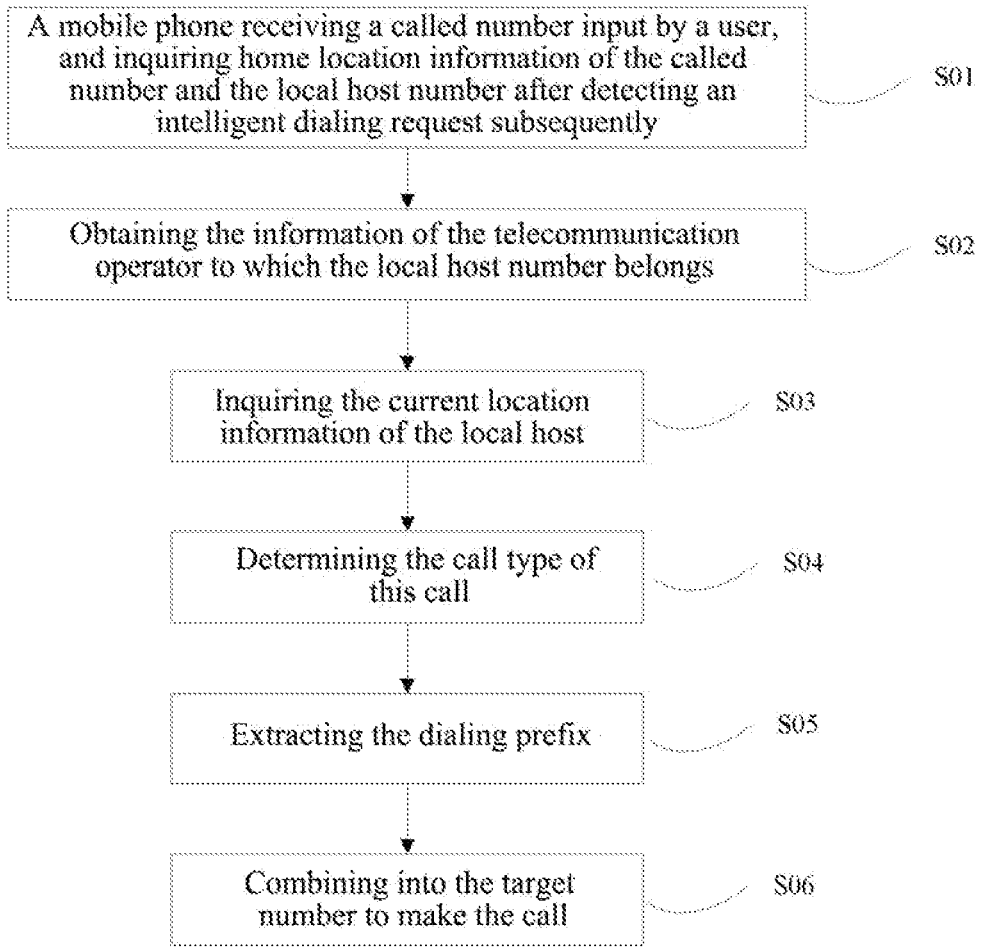
FIG. 3 is a flow chart of an intelligent dialing method according to an embodiment of the present invention.

FIG. 3 is a flow chart of an intelligent dialing method according to an embodiment of the present invention; as shown in FIG. 3, the intelligent dialing method according to the embodiment of the present invention comprises the following steps.

S01, a terminal (such as a mobile phone) receives an input telephone number, and inquires home location information of the called number and the local host number after detecting an intelligent dialing request.

The home location information of the local host number also can be read directly from the local host SIM card.

Since the numbering of the telephone numbers in various countries and various areas in the worldwide complies with certain rules, and the home location information of a telephone number can be known from the numbering rule of the telephone number, for example, the information of the telephone number belongs to which country and which province and city, etc. Now the technology for inquiring the home location information of the telephone number is very skilful, and will not be illustrated in detail here.

For example, if the number that the user is required to dial is 1367186****, and the dialing mode is similar to the normal dialing mode, which is to firstly locate the number to be dialed (or manually input the number) in the "Contacts" and then to press the preset "intelligent dialing key" to dial the phone call; and the mobile phone receives the telephone number input by the user and detects the intelligent dialing request that the user has pressed the "intelligent dialing key", and then inquires the home location information of the number according to the number dialed by the user, for example, the number belongs to a GSM card of China Mobile, and the home location is Shanghai China. At the same time, the home location information of the local host number is inquired.

If the user does not press the "intelligent dialing key", then the mobile phone calls using the normal call mode.

S02, a mobile phone reads the information of the telecommunication operator to which the local host number belongs from the local host SIM card.

Institutions for instituting IP dialing-in numbers, international access codes and country codes of the IP call services of different telecommunication operators are different. If the intelligent dialing requires starting, it is necessary to know the information of the telecommunication operator to which the local host number belongs. Generally, both the local host number and the information of the telecommunication operator to which the local host number belongs can be read from the local host SIM card.

S03, the current location information of the local host is inquired.

For example, the mobile phone can obtain the current location information of the local host through the information of the base station which provides services for the local host.

The execution sequence of the above steps S01 to S03 can be exchanged and also can be performed at the same time rather than being limited by the above sequence.

S04, the mobile phone determines the call type of this call according to the home location information of the called number, the home location information of the local host number or the current location information of the local host;

whether the call type of this call is the long distance can be judged based on whether the home location of the local host number is consistent with the home location of the called number; whether the call type of this call is roaming can be judged based on whether the current location of the local host is consistent with the home location of the local host number. For example, if it is inquired that the home country of the local host number is inconsistent with the home country of the called number, then it can be determined that the call type of this call is the international long distance; if it is inquired that the home country of the local host number is inconsistent with the home country of the called number, and the current located country of the local host is inconsistent with the home country of the local host number, then it can be determined that the call type of this call is international roaming; if it is inquired that the home country of the local host number is consistent with the home country of the called number but the home provinces and cities or areas are inconsistent, then it can be determined that the call type of this call is the domestic long distance.

Herein, the mobile phone opens the domestic IP phone call service by default.

S05, the dialing prefix corresponding to the telecommunication operator information of the local host number and the call type of this call is extracted from the database storing the dialing prefix;

the mobile phone stores a database in advance, and the database stores the IP dialing-in number of the IP call service, the international access code, the country code and the area code instituted by each telecommunication operator, for example, the telecommunication operator is China Mobile, and its instituted IP dialing-in numbers are 17951 and 17950, etc.; the telecommunication operator is China Unicorn, and its instituted IP dialing-in numbers is 17911, etc.

The mobile phone can know the call type of this call based on the step S04, and selects to add which kind of dialing prefixes according to the call type. If the mobile phone judges that the call type of this call of the user is the domestic long distance, then the IP dialing-in number corresponding to the telecommunication operator to which the local host number belongs requires adding; if the mobile phone judges that this call of the user is an international long distance call, then the international access code instituted by the telecommunication operator to which the local host number belongs and the country code of the home country of the called number, etc. require adding; if the mobile phone opens the international IP service, the international IP dialing-in number instituted by the telecommunication operator to which the local host number belongs can be added together.

S06, the extracted dialing prefix and the called number are combined into a target number for calling;

the extracted dialing prefix and the called number are combined into the final target number based on the normal dialing rule, and then the call is made.

The display screen of the mobile phone can display the combined final target number, and further can display the home location information of the called number.

Figure 4:
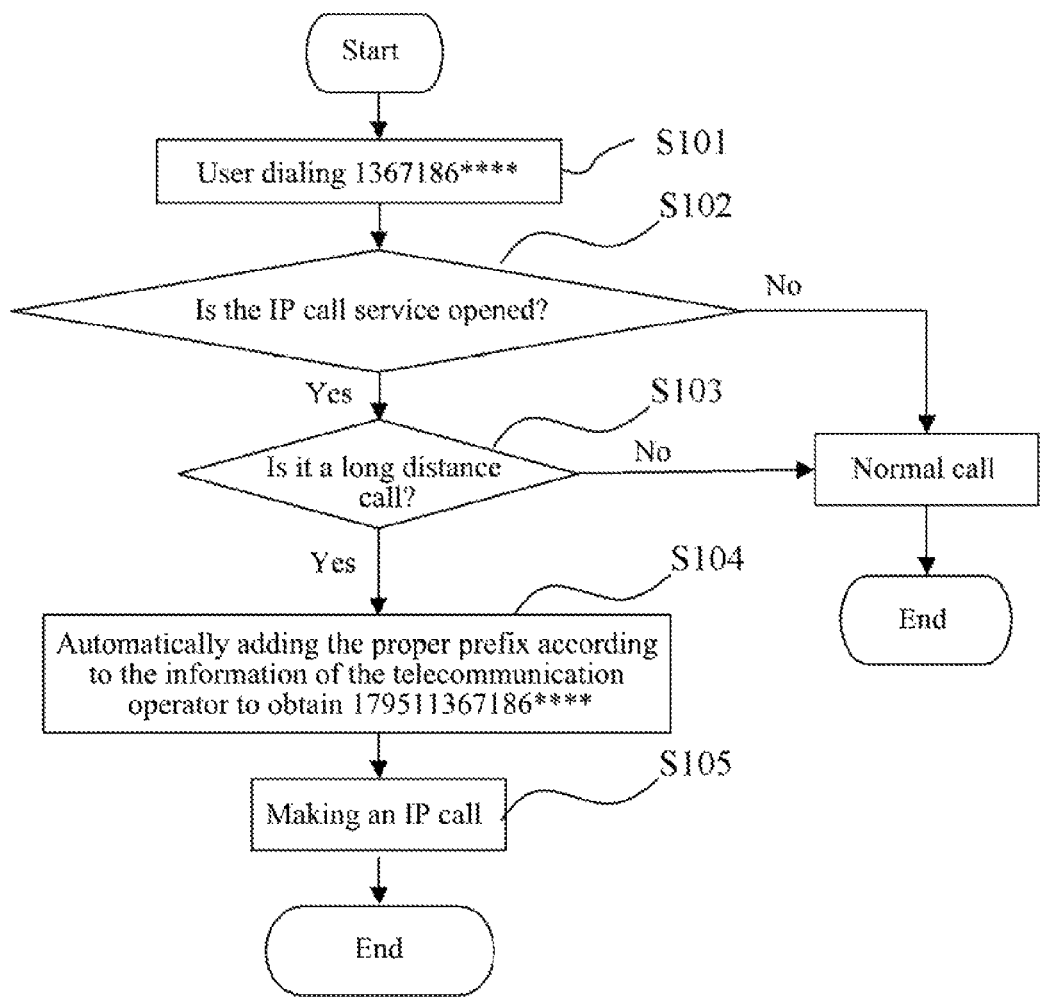
FIG. 4 is a flow chart of an application example for performing a domestic long distance call based on an intelligent dialing method according to the present invention.

FIG. 4 is a flow chart of an application example for performing a domestic long distance call based on an intelligent dialing method according to the present invention; as shown in FIG. 4, the procedure of the application example for performing a domestic long distance call comprises the following steps.

Step S101, if the number that the user is required to dial is 1367186****, the dialing mode is similar with the normal dialing mode, in which the number to be dialed is located firstly (or the number is manually input) in the "Contacts" and then the preset "intelligent dialing key" is pressed to dial the phone call.

Step S102, the terminal (such as, a mobile phone) judges whether the domestic IP phone call service is opened; if the mobile phone does not open the domestic IP phone call service, then make the call as a normal call;

if the mobile phone opens the domestic IP phone call service, then the mobile phone inquires that the telecommunication operator of the called number is China Mobile and the home location is Shanghai and inquires that the home location of the local host number is Chengdu and the telecommunication operator to which the local host number belongs is China Mobile for example after receiving the intelligent dialing request of the user; the mobile phone also can further inquire the current location information of the local host, for example, the user is currently in Chengdu, and then the mobile phone is not roaming.

Step S103, since the home location of the called number is inconsistent with the home location of the local host number, the mobile phone determines that this call is a domestic long distance call, and then is required to add the IP dialing-in number prefix to save the call cost.

Step S104, the first IP dialing-in number prefix to be added is 17951 is obtained by inquiring the database, storing the dialing prefix, stored in the mobile phone in advance according to the telecommunication operator to which the local host number belongs; then the mobile phone automatically generates the final target number: 179511367186**** to make the call;

in the call process, the mobile phone displays the final target number: 179511367186****.

Step S105, the IP phone call is made until the user hangs up.

Normally, the user knows the telecommunication operator to which the mobile phone number used by the user itself belongs, so the user can also manually set the IP dialing-in number of the telecommunication operators to which the local host number belongs.

If the user is required to make an international long distance call, the method is similar with the above method for the domestic long distance call. The different is that the dialing prefix to be extracted at this time is the first international access code, and the country code and the area code of the called number, etc., and then the dialing prefix and the called number are combined into the target number for calling. If the mobile phone also opens the international IP phone call service, then it is also required to extract the second IP dialing-in number prefix to be combined together into the target number for calling, so as to save the call cost. The second IP dialing-in number that requires adding when dialing the international long distance call and the first IP dialing-in number that requires adding when dialing the domestic long distance call can be same or different, which can be set freely by the telecommunication operator.

Figure 5:
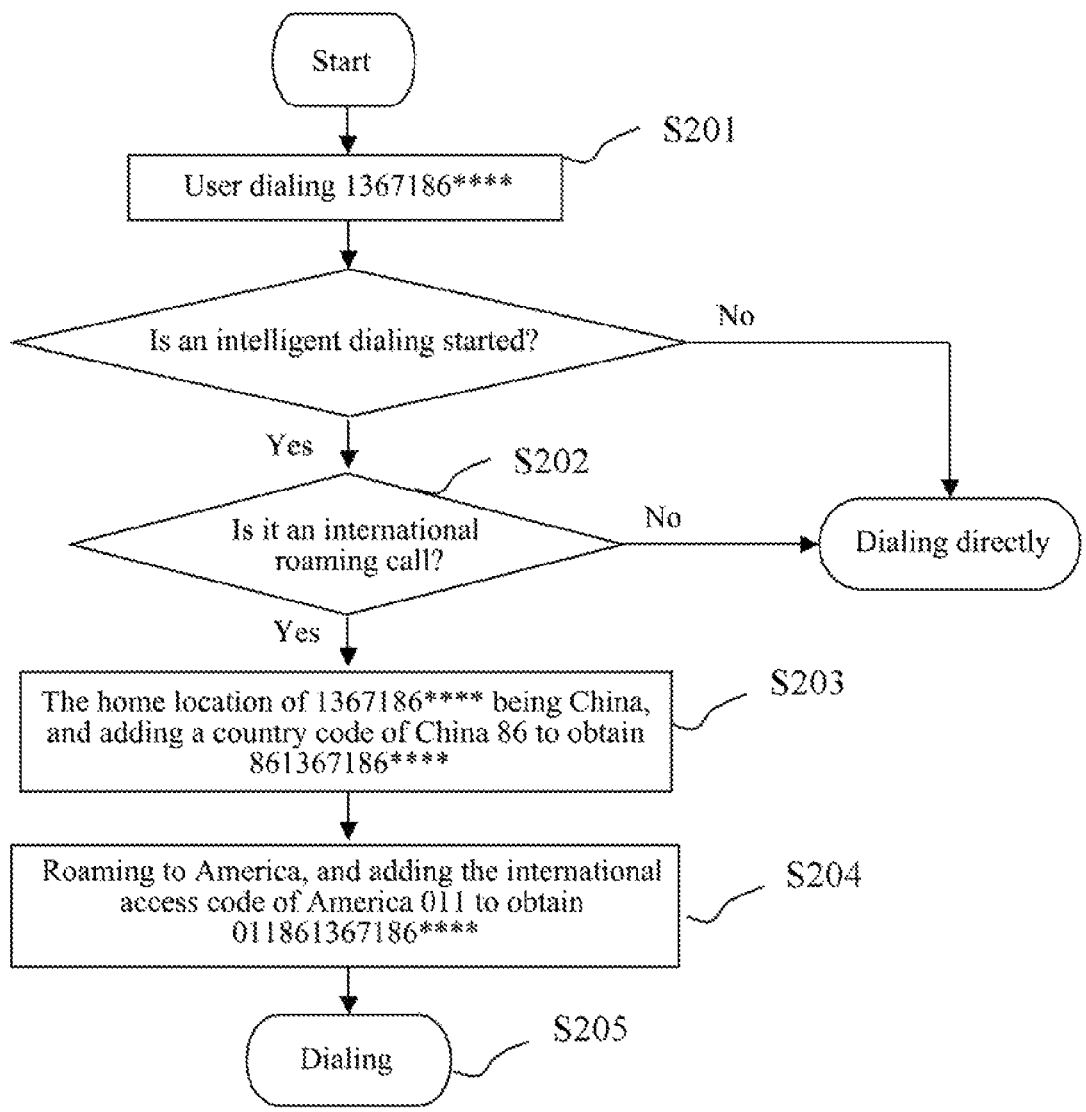
FIG. 5 is a flow chart of an application example for performing an international roaming call based on an intelligent dialing method according to the present invention.

Here a more complex application example is taken as an example, as shown in FIG. 5, which is a flow chart of an application example for performing an international long distance call based on an intelligent dialing method according to the present invention. The procedure of the application example for performing an international long distance call comprises the following steps.

Step S201, for example, the user in America calls a called number whose home location is Shanghai using a mobile phone whose home location is Chengdu, China;

the user firstly locates the number to be dialed in the "Contacts" (or manually inputs the number 1367186**** then presses the preset "intelligent dialing key". If the user does not start the intelligent dialing, then the user is required to manually input the international access number and the country code, etc.

Step S202, the mobile phone inquiries that the home location of the called number is Shanghai, China after receiving the intelligent dialing request of the user; by detecting the local host SIM card, the mobile phone can know that the local host uses the number of the CDMA network of China Unicorn and the home location of the local host number is Chengdu, China, and detects that the current location of the local host is America, then it is determined that this call is an international roaming call.

Step S203, since the home location of the called number 1367186** is China, then the country code of China 86 requires adding to Obtain 861367186, Step S204, the mobile phone detects that the current location of the local host is America and determines that the local host now is in the international roaming state and the roaming place is America, then it is required to add the international access code of America, and the international access code of America is 011, thereby obtaining 011861367186**.

Step S205, the call is made using the target number 011861367186****.

If the mobile phone opens the international IP call service, then the mobile phone inquires the third IP dialing-in number corresponding to the telecommunication operator to which the local host number belongs from the dialing prefix database. Here the third IP dialing-in number is instituted by the telecommunication operator of the country or area where the local host is currently located. The telecommunication operator to which the local host number of the present embodiment belongs is a telecommunication operator in local America, and the third IP dialing-in number is instituted by the telecommunication operator in local America, for example "********", and then the final target number "******011861367186" is generated; and then "******011861367186**" is called so as to save the call cost.

The mobile phone also can display the target number "011861367186**" or "******011861367186**" to the user, and further the mobile phone also can display the home location information of the called number.

The above descriptions are two embodiments of the present invention in the specific cases. Obviously, the present invention also has many different embodiments for the different cases (the domestic long distance call, the international long distance call and the international roaming call, etc.), and here it will not be described one by one. Those skilled in the art can make the corresponding modifications and variations according to the present invention without departing from the spirit and essence of the present invention. However, all of these modifications or variations should be fall into the scope of the appending claims of the present invention.

Industrial Applicability

The intelligent dialing method and the terminal provided by the present invention are able to automatically inquire the information of the home location of the called number, etc., and add the proper dialing prefix after the user dialing, thereby reducing the complexity of the user's operation and improving the user's experience.

What is claimed is:

1. An intelligent dialing method, comprising:
a terminal receiving a called number input by a user and inquiring home location information of the called number;
obtaining home location information of a local host number and information of a telecommunication operator to which the local host number belongs;
determining a call type according to the home location information of the called number and the home location information of the local host number and current location information of a local host;
extracting a dialing prefix corresponding to the call type and the telecommunication operator to which the local host number belongs according to corresponding relationship information among a stored dialing prefix with the telecommunication operator and the call type; and
combining the extracted dialing prefix with the called number into a target number to make the call;
wherein the determining the call type comprises:
when the home location information of the local host number is consistent with the current location information of the local host, and a home country of the local host number is consistent with a home country of the called number but home provinces and cities or areas thereof are inconsistent, determining that the call type is a domestic long distance call;

when the home location information of the local host number is consistent with the current location information of the local host, and a home country of the local host number is inconsistent with a home country of the called number, determining that the call type is an international long distance call; and when the home location information of the local host number is inconsistent with the current location information of the local host, determining that the call type is an international roaming call.

2. The method according to claim 1, wherein
the stored dialing prefix includes: an IP dialing-in number, an international access code, and a country code or an area code corresponding to the telecommunication operator to which the local host number belongs.

3. The method according to claim 2, wherein,
when the call type is a domestic long distance call,
the combining the extracted dialing prefix with the called number into the target number to make the call comprises:
if the terminal opens a domestic IP phone call service, then extracting a first IP dialing-in number corresponding to the telecommunication operator to which the local host number belongs and combining the first IP dialing-in number with the called number into the target number to make the call.

4. The method according to claim 2, wherein, when the call type is an international long distance call, the combining the extracted dialing prefix with the called number into the target number to make the call comprises:
if the terminal does not open an international IP phone call service, then extracting a first international access code and the country code or the area code corresponding to the telecommunication operator to which the local host number belongs and combining the first international access code and the country code or the area code with the called number into the target number to make the call.

5. The method according to claim 2, wherein,
when the call type is an international long distance call,
the combining the extracted dialing prefix with the called number into the target number to make the call comprises:
if the terminal opens the international IP phone call service, then extracting a first international access code and the country code or the area code corresponding to the telecommunication operator to which the local host number belongs and a second IP dialing-in number corresponding to the telecommunication operator to which the local host number belongs, and combining the second IP dialing-in number, the first international access code, the country code or the area code with the called number into the target number to make the call.

6. The method according to claim 2, wherein,
when the call type is an international roaming call,
the combining the extracted dialing prefix with the called number into the target number to make the call comprises:
if the terminal does not open an international IP phone call service, then extracting a second international access code and the country code or the area code corresponding to the telecommunication operator to which the local host number belongs, and combining the second international access code, the country code or the area code with the called number into the target number to make the call.

7. The method according to claim 2, wherein,
when the call type is an international roaming call,
the combining the extracted dialing prefix with the called number into the target number to make the call comprises:
if the terminal opens an international IP phone call service, then extracting a second international access code and the country code or the area code corresponding to the telecommunication operator to which the local host number belongs and a third IP dialing-in number corresponding to the telecommunication operator to which the local host number belongs, and combining the third IP dialing-in number, the second international access code, and the country code or the area code with the called number into the target number to make the call.

8. A terminal, comprising an input unit, a control unit, a storage unit and a call unit, wherein
the input unit is configured to transmit a called number input by a user to the control unit;
the storage unit is configured to store a database storing corresponding relationship information among a dialing prefix with a telecommunication operator and a call type;
the control unit is configured to receive the called number, and then transmit the called number to inquire the home location information, and then receive the home location information of the called number; obtain home location information of a local host number and information of a telecommunication operator to which the local host number belongs; determine the call type according to the home location information of the called number and the home location information of the local host number and current location information of a local host; extract a dialing prefix corresponding to the telecommunication operator to which the local host number belongs and the call type from the database according to the corresponding relationship information among the stored dialing prefix with the telecommunication operator and the call type; and combine the extracted dialing prefix with the called number into a target number and then transmit the target number to the call unit;
the call unit is configured to call using the target number after receiving the target number;
wherein the determined call type includes:
a domestic long distance call if the home location information of the local host number is consistent with the current location information of the local host, and a home country of the local host number is consistent with a home country of the called number but home provinces and cities or areas thereof are inconsistent;
an international long distance call if the home location information of the local host number is consistent with the current location information of the local host, and a home country of the local host number is inconsistent with a home country of the called number; and
an international roaming call if the home location information of the local host number is inconsistent with the current location information of the local host.

9. The terminal according to claim 8, wherein the control unit is further configured to:
detect the current location information of the terminal; and
determine the call type according to the home location information of the called number, the home location information of the local host number and the current location information of the terminal; extracts the dialing prefix corresponding to the telecommunication operator to which the local host number belongs and the call type from the database according to the corresponding relationship information among the stored dialing prefix with the telecommunication operator and the call type; and combine the extracted dialing prefix with the called number into the target number and then transmit the target number to the call unit.

10. The terminal according to claim 8, further comprising an intelligent dialing key and a display unit, wherein,
the intelligent dialing key is configured to transmit a triggering signal for entering into an intelligent dialing state to the control unit after the user inputting the called number;
the display unit is configured to display the target number.

11. The terminal according to claim 9, further comprising an intelligent dialing key and a display unit, wherein,
the intelligent dialing key is configured to transmit a triggering signal for entering into an intelligent dialing state to the control unit after the user inputting the called number;
the display unit is configured to display the target number.

* * * * *